United States Patent
Mochizuki

Patent Number: 6,147,723
Date of Patent: Nov. 14, 2000

[54] DISPLAY DEVICE WITH MULTILAYER FILM BETWEEN LCD AND BACKLIGHT

[75] Inventor: Noritaka Mochizuki, Yokohama, Japan

[73] Assignee: Canon Kabushiki Kaisha, Tokyo, Japan

[21] Appl. No.: 08/609,213

[22] Filed: Mar. 1, 1996

Related U.S. Application Data

[63] Continuation of application No. 08/165,412, Dec. 13, 1993, abandoned.

[30] Foreign Application Priority Data

Dec. 22, 1992 [JP] Japan .................................. 4-342504
Feb. 1, 1993 [JP] Japan .................................. 5-014859

[51] Int. Cl.[7] .................................................. G02F 1/1335
[52] U.S. Cl. .......................................... 349/62; 349/105
[58] Field of Search .............................. 359/50; 349/62, 349/65, 105, 106, 104

[56] References Cited

U.S. PATENT DOCUMENTS

| | | | |
|---|---|---|---|
| 3,736,047 | 5/1973 | Gelber et al. ........................... | 349/137 |
| 4,704,004 | 11/1987 | Nosker ...................................... | 350/345 |
| 4,737,896 | 4/1988 | Mochizuki et al. ..................... | 362/301 |
| 4,766,498 | 8/1988 | Spruit ....................................... | 358/237 |
| 4,822,144 | 4/1989 | Vriens . | |
| 4,870,484 | 9/1989 | Sonehara ................................. | 358/59 |
| 4,882,617 | 11/1989 | Vriens ...................................... | 358/60 |
| 4,976,514 | 12/1990 | Murata et al. ........................... | 350/345 |
| 5,058,997 | 10/1991 | Disckerson et al. .................... | 349/105 |
| 5,135,300 | 8/1992 | Toide et al. .............................. | 353/31 |
| 5,248,518 | 9/1993 | Toide et al. .............................. | 427/64 |
| 5,248,917 | 9/1993 | Hamagishi et al. ................. | 315/169.1 |
| 5,296,951 | 3/1994 | Fox .......................................... | 359/48 |
| 5,315,418 | 5/1994 | Sprague et al. .......................... | 359/41 |

OTHER PUBLICATIONS

Born et al., "Principles of Optics", p. 285, 1970.

*Primary Examiner*—Kenneth Parker
*Attorney, Agent, or Firm*—Fitzpatrick, Cella, Harper & Scinto

[57] ABSTRACT

A substrate provided with a multi-layer film, the reflectance of which is incidence angle dependency is disposed between a planar light emitting body and a liquid crystal panel. Rays of light within a predetermined angle from the light emitting body are selectively caused to enter the liquid crystal panel through the substrate provided with the multi-layer film.

12 Claims, 7 Drawing Sheets

DISPLAY DEVICE WITH MULTILAYER FILM BETWEEN LCD AND BACKLIGHT

This application is a continuation of application Ser. No. 08/165,412, filed Dec. 13, 1993, now abandoned.

BACKGROUND OF THE INVENTION

1. Field of the Invention

This invention relates to a display device and an information processing apparatus having the display device, and particularly to a display device having a liquid crystal light valve, and an information processing apparatus employing the display device having the liquid crystal light valve, such as a projection type TV set, a direct view type TV set, a word processor or a computer.

2. Related Background Art

Recently, the display device of such information processing apparatus illuminates a liquid crystal light valve (panel) from the back thereof by a planar fluorescent lamp.

However, as shown in FIG. 11 of the accompanying drawings, a planar fluorescent lamp 1 has a light emission distribution 2 similar to the distribution of diffused light emitted by a complete diffusion surface, and the light from the fluorescent lamp 1 has a large angle of emission and includes many rays of light having a large angle of incidence onto a liquid crystal light valve. The modulating performance of the liquid crystal light valve deteriorates as the angle of incidence of the incident ray of light becomes larger and therefore, when the fluorescent lamp 1 is used, there are created rays of light which are not properly modulated by the liquid crystal light valve, thereby causing a deterioration in the quality of the image produced by the liquid crystal light valve.

SUMMARY OF THE INVENTION

It is the object of the present invention to provide a display device for displaying high quality images and an information processing apparatus provided with such display device.

The display device and information processing apparatus of the present invention comprise a liquid crystal light valve and illuminating means for illuminating the liquid crystal light valve, the illuminating means having a light emitting plate of a large angle of emission and a multi-layer film for selectively reflecting some part of the light from the plate to reduce the angle of emission and cause the light to enter the light valve.

In a preferred form, the display device and information processing apparatus of the present invention comprise a liquid crystal light valve and illuminating means for illuminating the liquid crystal light valve, the illuminating means having a light emitting plate of a large angle of emission, and a substrate facing the plate with an air layer interposed therebetween having a multi-layer film for selectively reflecting some part of the light from the plate to reduce the angle of emission and cause the light to enter the light valve.

In another preferred form, the display device and information processing apparatus of the present invention comprise a liquid crystal light valve and illuminating means for illuminating the liquid crystal light valve, the illuminating means having a fluorescent plate responsive to radiation energy to emit visible light of a large angle of emission, a multi-layer film for selectively reflecting some part of the light from the fluorescent plate to reduce the angle of emission and cause the light to enter the light valve, and an another film such as a dichroic film provided on a side of the fluorescent plate which is opposite to the multi-layer film so as to transmit the radiation energy therethrough and reflect the visible light.

DETAILED DESCRIPTION OF THE PREFERRED EMBODIMENTS

Figure 1:
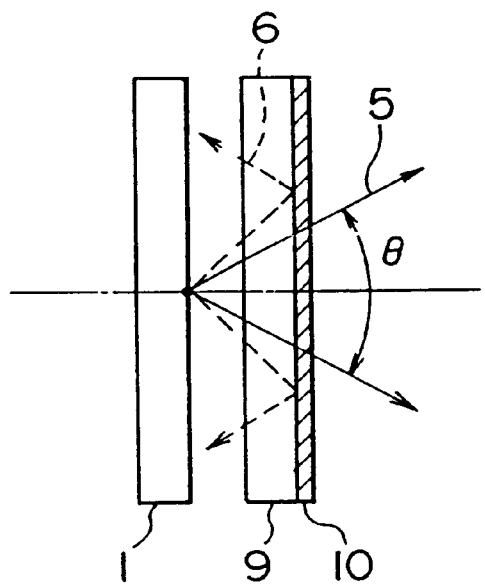
FIG. 1 is an illustration showing an embodiment of the present invention.

Referring to FIG. 1 which is an illustration showing an embodiment of the light source device of the present invention, numeral 1 designates a planar fluorescent lamp. The reference numeral 9 denotes a plane parallel substrate formed of glass or plastic almost transparent to light from the fluorescent lamp 1. The surface of the substrate 9 and the light emitting surface of the fluorescent lamp 1 are parallel to each other, and the two are disposed proximately to each other with an air layer of e.g. 1 mm interposed therebetween. Numeral 10 designates multi-layer film (reflecting mirror) formed on that surface of the substrate 9 which is opposite to the fluorescent lamp 1. This multi-layer film 10 is constructed such that by suitably determining the refractive indices of alternate layers forming the multi-layer film, a ray of light 5 within the range of an angle θ is transmitted therethrough and a ray of light 6 outside the range of the angle θ (of which the angle of incidence exceeds θ/2) is totally reflected by the interface between the alternate layers.

This light source device can obtain only the flux of the ray of light 5 within the range of the angle θ as an illuminating light flux due to the effect of the multi-layer film 10 and moreover, the ray of light 6 reflected by the multi-layer film 10 is scattered by the fluorescent lamp 1 and again enters the substrate 9 from the fluorescent lamp 1, and some of it is obtained as the ray of light 5 and therefore, the amount of loss of the light becomes small.

Figure 2:
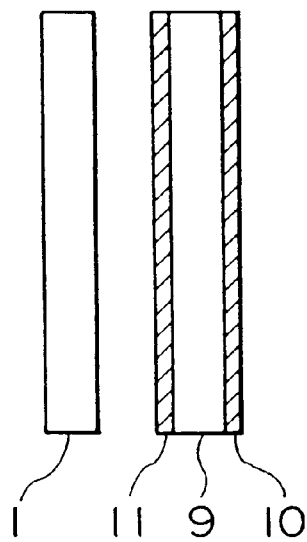
FIG. 2 is a schematic view showing another embodiment of the present invention.

FIG. 2 is a schematic view showing another embodiment of the light source device of the present invention, and in FIG. 2, the same members as those in the device of FIG. 1 are given the same reference numerals and need not be described. The difference of this light source device from the device of FIG. 1 is that multi-layer film 11 is formed also on that surface of the substrate 9 which is adjacent to the fluorescent lamp 1, and this light source device also achieves an effect similar to that of the device of FIG. 1.

As a modification of the light source devices of FIGS. 1 and 2, there is a form in which a multi-layer film reflecting mirror is formed only on that surface of the substrate 9 which is adjacent to the fluorescent lamp 1.

Figure 3:
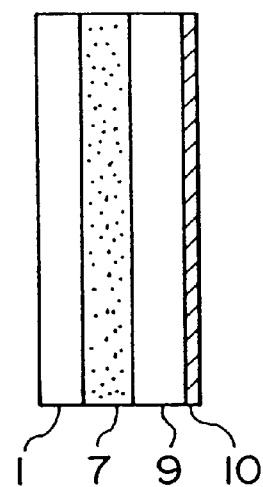
FIG. 3 is a schematic view showing still another embodiment of the present invention.

FIG. 3 is a schematic view showing still another embodiment of the light source device of the present invention, and in FIG. 3, the same members as those in the device of FIG. 1 are given the same numerals and need not be described. The difference of this light source device from the device of FIG. 1 is that the fluorescent lamp 1 and the substrate 9 are joined together by an adhesive agent 7. This light source device also achieves an effect similar to that of the device of FIG. 1.

Figure 4:
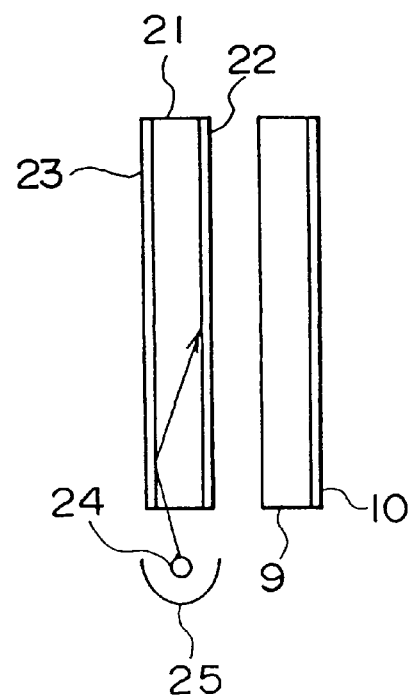
FIG. 4 is a schematic view showing yet still another embodiment of the present invention.

FIG. 4 is a schematic view showing yet still another embodiment of the light source device of the present invention, and this embodiment is one which uses a wave guide plate type planar light source instead of the planar fluorescent lamp 1. In FIG. 4, numeral 9 designates a glass substrate and numeral 10 denotes multi-layer film, and these have the same functions as those of the aforedescribed embodiments. Numeral 21 designates a light directing portion formed of glass or plastic, numeral 22 denotes a light scattering portion provided by roughening a front surface of the glass 21, numeral 23 designates a mirror portion comprising metallic reflecting film formed on a back surface of the glass 21, numeral 24 denotes a lamp, and numeral 25 designates a back mirror of a spherical surface or a parabolic surface provided on the back of the lamp 24. The light from the lamp 24 and back mirror 25 propagates through the glass 21 while being reflected and is scattered by the light scattering portion 22 on the surface of the glass 21 and illuminates the glass substrate 9 having the multi-layer film 10.

Figure 5:
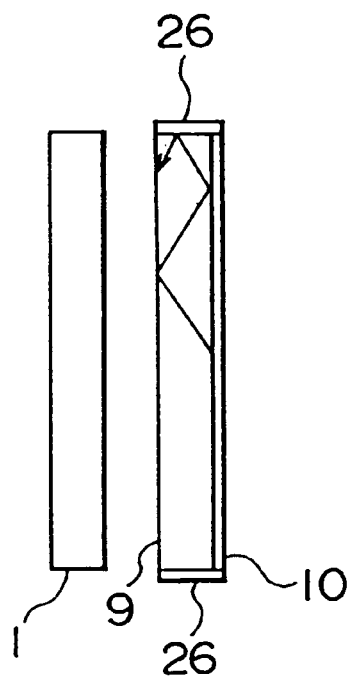
FIG. 5 is a schematic view showing a further embodiment of the present invention.

FIG. 5 is a schematic view showing a further embodiment of the light source device of the present invention. Reflecting film 26 is formed on the upper, lower, left and right portions (side surfaces) of the glass substrate 9 of the device of FIG. 1 to thereby prevent the light from leaking from the four portions of the glass substrate 9. The functions of the glass substrate 9 and multi-layer film 10 are the same as those of the aforedescribed embodiments.

Figure 6:
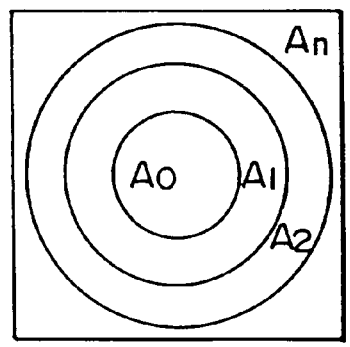
FIG. 6 is an illustration showing still a further embodiment of the present invention.

FIG. 6 is an illustration showing still a further embodiment of the light source device of the present invention, and represents the distribution of the multi-layer film on the surface of the glass substrate 9 of the device of FIG. 1. The intensity of a plate type light source is usually reduced from the center to the periphery thereof and therefore, as shown in FIG. 6, on the surface of the glass substrate 9, different multi-layer films are formed as circular or zonal shapes $A_o$–$A_n$ from the center to the periphery, and the transmittances of the respective multi-layer films are gradually reduced from the periphery to the center, whereby the luminance distribution of the light after having emerged from the multi-layer films 10 may become uniform.

Figure 7:
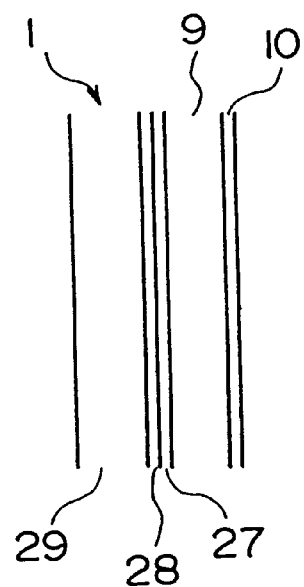
FIG. 7 is a schematic view showing yet still a further embodiment of the present invention.
Figure 8:
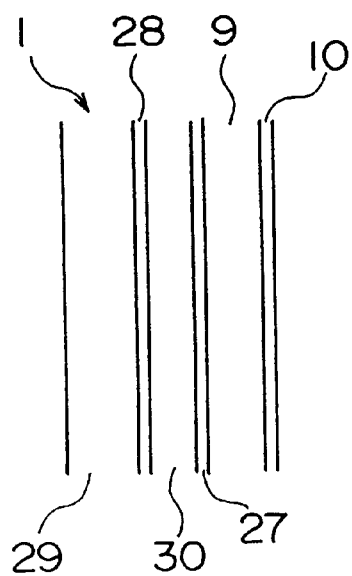
FIG. 8 is a schematic view showing a further embodiment of the present invention.

FIGS. 7 and 8 are schematic views showing further embodiments of the light source device of the present invention, and in these embodiments, the glass substrate 9 and multi-layer film 10 have the same functions as those of the aforedescribed embodiments. The fluorescent lamp 1 creates ultraviolet light within the tube thereof, and this ultraviolet light is applied to the fluorescent surface thereof to fluoresce, thereby creating visible light. A ray of light of a large angle of emergence reflected by the multi-layer film 10 on the glass substrate 9 of the device of FIG. 1 enters the fluorescent surface of the fluorescent lamp 1, and some of it reaches the interior of the tube and does not return to the glass substrate 9 side. So, in these two embodiments, as shown in FIGS. 7 and 8, dichroic film transmitting ultraviolet rays therethrough and reflecting visible light is provided between the fluorescent surface 27 and fluorescent tube (glass tube) 29 of the fluorescent lamp 1, and the light reflected by the multi-layer film 10 is mostly caused to re-enter the glass substrate 9 without being caused to enter into the tube 29. The embodiment of FIG. 7 is one in which the fluorescent lamp 1 and the glass substrate 9 are in intimate contact with each other, and the fluorescent lamp 1 has dichroic film formed on the tube 29, and fluorescent paint is applied on this film. The embodiment of FIG. 8 is such that fluorescent paint is applied to the surface of the glass substrate 9 to provide the fluorescent surface 27 and dichroic film is formed on the surface of the tube 29 of the fluorescent lamp 1. In FIG. 8, numeral 20 designates a clearance.

Figure 9:
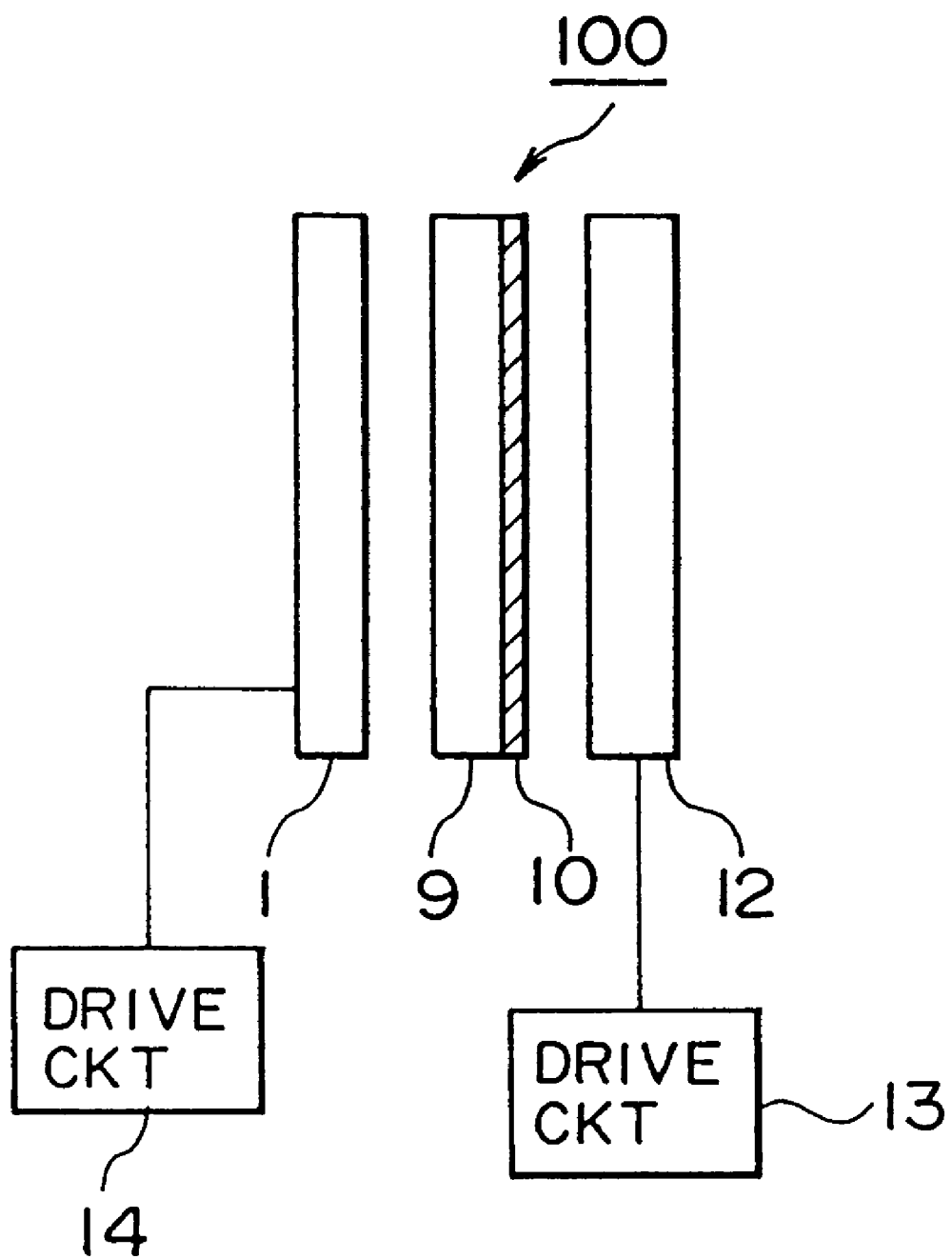
FIG. 9 is a schematic diagram showing an example of the display device of the present invention.

FIG. 9 is an illustration showing an example of the display device of the present invention, and in FIG. 9, the same members as those in the device of FIG. 1 are given the same reference numerals and need not be described. In FIG. 9, numeral 12 denotes a liquid crystal panel which may be any of various commercially available liquid crystal display panels. Numeral 13 designates a driving circuit for the liquid crystal panel, and numeral 14 denotes a driving circuit for the planar fluorescent lamp 1. Numeral 100 designates the display device. As can be understood from the description of FIG. 1, according to this display device 100, most of the light emitted from the fluorescent lamp 1 can be turned within a limited range of angle, and light within a range of angle (e.g. $\theta \equiv 20°$) suited for the incidence angle characteristic of the light modulating effect of the liquid crystal panel is caused to enter the liquid crystal panel. Accordingly, images which are very bright and easy to see can be displayed.

The display device of the present invention is not restricted to the form shown in FIG. 9. That is, it also includes forms in which the light source devices of FIGS. 1 to 8 are applied as the light source portions of conventional various liquid crystal display devices.

Figure 10A:
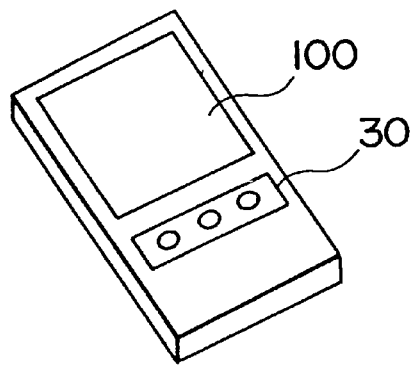
FIGS. 10A, 10B and 10C are schematic views showing some applications of the display device of the present invention, FIG. 10A showing a compact TV set, FIG. 10B showing a word processor, and FIG. 10C showing a projection type TV set.
Figure 10B:
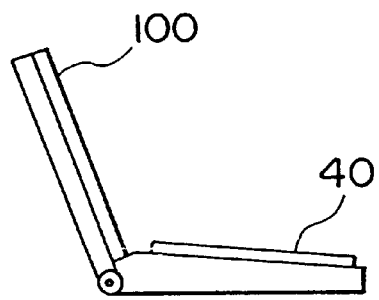
Figure 10C:
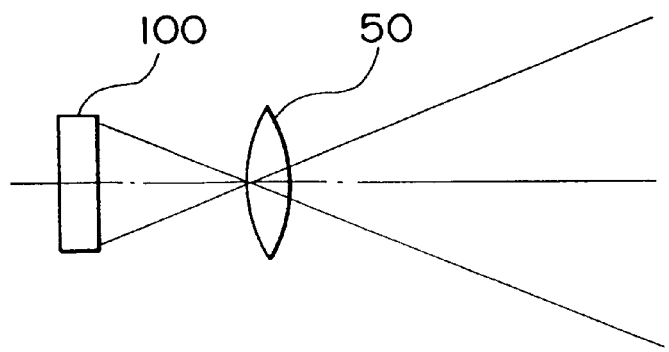
Figure 11:
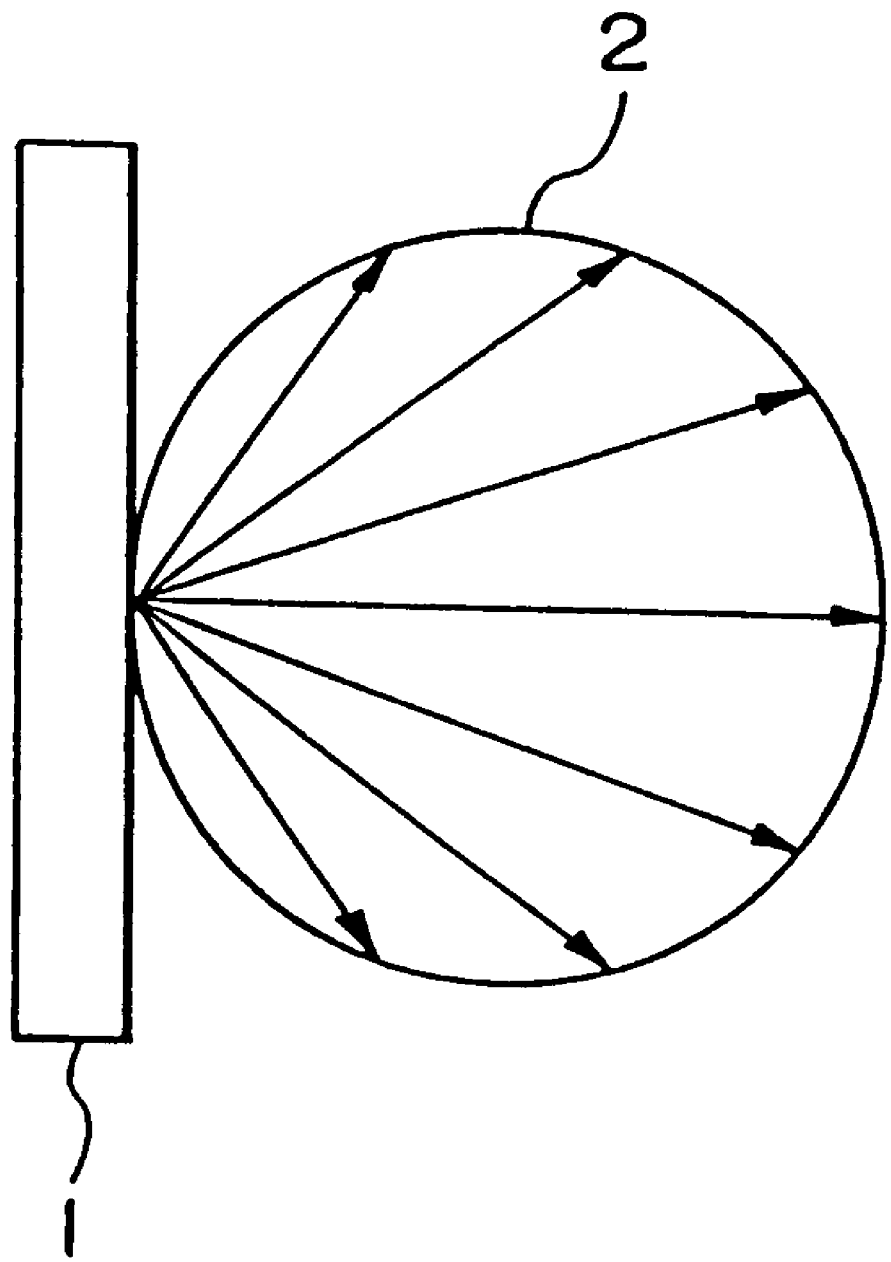
FIG. 11 is an illustration of the conventional display device.

FIGS. 10A, 10B and 10C are schematic views showing some applications of the above-described display device 100 as shown in FIG. 9, FIG. 10A showing a compact TV set provided with the display device 100 and an operating portion 30, FIG. 10B showing a word processor provided with the display device 100 and a keyboard 40, and FIG. 10C showing a projection type TV set provided with the display device 100 and a projection lens system 50.

The display device of the present invention is also applicable to personal computers, computer systems, control systems, etc., besides the business machines shown in FIGS. 10A to 10C.

According to the present invention, the light from the planar light emitting body can be turned within a predetermined range of angle, and the light from the planar light emitting body can be efficiently caused to enter the liquid crystal panel to thereby enable a bright display to be accomplished.

What is claimed is:

1. A display device comprising:
   a liquid crystal light valve; and
   illuminating means for illuminating said liquid crystal light valve, said illuminating means having a wave guide plate type planar light source and a substrate facing said light source with an air layer interposed therebetween and having a multi-layer film for selectively reflecting some part of the light from said wave guide plate type planar light source without effecting color-filtering so as to make divergence of the light from said light source small, with said multi-layer film being divided into a plurality of regions having different transmittance from one another, said plurality of regions being so distributed as to uniformize an intensity distribution of the light from said light source.

2. An information processing apparatus comprising:

a liquid crystal light valve; and illuminating means for illuminating said liquid crystal light valve, said illuminating means having a wave guide plate type planar light source and a substrate facing said light source with an air layer interposed therebetween and having a multi-layer film for selectively reflecting some part of the light from said wave guide plate type planar light source without effecting color-filtering so as to make divergence of the light from said light source small, with said multi-layer film being divided into a plurality of regions having different transmittance from one another, said plurality of regions being so distributed as to uniformize an intensity distribution of the light from said light source.

3. A display device comprising:

a liquid crystal light valve; and illuminating means for illuminating said liquid crystal light valve, said illuminating means having a wave guide plate type planar light source and a substrate facing said light source and having a multi-layer film for selectively reflecting some part of the light from said wave guide plate type planar light source without effecting color-filtering so as to make divergence of the light from said light source small, with said multi-layer film being divided into a plurality of regions having different transmittance from one another, said plurality of regions being so distributed as to uniformize an intensity distribution of the light from said light source.

4. An information processing apparatus comprising:

a liquid crystal light valve; and illuminating means for illuminating said liquid crystal light valve, said illuminating means having a wave guide plate type planar light source and a substrate facing said light source and having a multi-layer film for selectively reflecting some part of the light from said wave guide plate type planar light source without effecting color-filtering so as to make divergence of the light from said light source small, with said multi-layer film being divided into a plurality of regions having different transmittance from one another, said plurality of regions being so distributed as to uniformize an intensity distribution of the light from said light source.

5. A display device comprising:

a liquid crystal light valve; and illuminating means for illuminating said liquid crystal light valve, said illuminating means having a wave guide plate type planar light source and a substrate facing said light source and having a multi-layer film for selectively reflecting some part of the light from said wave guide plate type planar light source without effecting color-filtering so as to make divergence of the light from said light source small, and wherein said light source includes a transparent plate having a scattering surface on a front surface, a reflection surface on a rear surface, and a lamp, with said multi-layer film being divided into a plurality of regions having different transmittance from one another, said plurality of regions being so distributed as to uniformize an intensity distribution of the light from said light source.

6. An information processing apparatus comprising:

a liquid crystal light valve; and illuminating means for illuminating said liquid crystal light valve, said illuminating means having a wave guide plate type planar light source and a substrate facing said light source and having a multi-layer film for selectively reflecting some part of the light from said wave guide plate type planar light source without effecting color-filtering so as to make divergence of the light from said light source small, and wherein said light source includes a transparent plate having a scattering surface on a front surface, a reflection surface on a rear surface, and a lamp, with said multi-layer film being divided into a plurality of regions having different transmittance from one another, said plurality of regions being so distributed as to uniformize an intensity distribution of the light from said light source.

7. A display device comprising:

a liquid crystal light valve; and an illuminating device for illuminating said liquid crystal light valve, said illuminating device having a wave guide plate type planar light source and a substrate facing said light source and having a multi-layer film for selectively reflecting some part of the light from said wave guide plate type planar light source so as to make divergence of the light from said light source small, with said multi-layer film being divided into a plurality of regions having different transmittance from one another, said plurality of regions being so distributed as to uniformize an intensity distribution of the light from said light source.

8. An information processing apparatus comprising:

a liquid crystal light valve; and an illuminating device for illuminating said liquid crystal light valve, said illuminating device having a wave guide plate type planar light source and a substrate facing said light source and having a multi-layer film for selectively reflecting some part of the light from said wave guide plate type planar light source so as to make divergence of the light from said light source small, with said multi-layer film being divided into a plurality of regions having different transmittance from one another, said plurality of regions being so distributed as to uniformize an intensity distribution of the light from said light source.

9. An illuminating device comprising:

a wave guide plate type planar light source; and a substrate facing said light source and having a multi-layer film for selectively reflecting some part of the light from said wave guide plate type planar light source without effecting color-filtering so as to make divergence of the light from said light source small, with said multi-layer film being divided into a plurality of regions having different transmittance from one another, said plurality of regions being so distributed as to uniformize an intensity distribution of the light from said light source.

10. A display device comprising:

a liquid crystal light valve; and an illuminating device for illuminating said liquid crystal light valve, said illuminating device having a light source and a substrate facing said light source and having a multi-layer film for selectively reflecting some part of the light from said light source so as to make divergence of the light from said light source small, said multi-layer being divided into a plurality of regions having different transmittance from one another, said plurality of regions being so distributed as to uniformize an intensity distribution of the light from said light source.

11. An information processing apparatus comprising:

a liquid crystal light valve; and an illuminating device for illuminating said liquid crystal light valve, said illuminating device having a light source and a substrate facing said light source and having a multi-layer film for selectively reflecting some part of the light from said light source so as to make divergence of the light from said light source small, said multi-layer film being divided into a plurality of regions having different transmittance from one another, said plurality of regions being so distributed as to uniformize an intensity distribution of the light from said light source.

12. An illuminating device comprising:

a light source;

a substrate facing said light source and having a multi-layer film for selectively reflecting some part of the light from said light source so as to make divergence of the light from said light source small, said multi-layer film being divided into a plurality of regions having different transmittance from one another, said plurality of regions being so distributed as to uniformize an intensity distribution of the light from said light source.

* * * * *

UNITED STATES PATENT AND TRADEMARK OFFICE
CERTIFICATE OF CORRECTION

PATENT NO. : 6,147,723
DATED : November 14, 2000
INVENTOR(S) : Noritaka Mochizuki It is certified that error appears in the above-identified patent and that said Letters Patent is hereby corrected as shown below:

<u>Title page,</u>
After Assignee: please insert the following:
-- [*]   Notice: This patent issued on a continued prosecution application filed under 37 CFR 1.53(d), and is subject to the twenty year patent term provisions of 35 U.S.C. 1.54(a) (2). --

Signed and Sealed this

Eighteenth Day of March, 2003

JAMES E. ROGAN
*Director of the United States Patent and Trademark Office*